United States Patent [19]
Chen

[11] Patent Number: 6,102,540
[45] Date of Patent: Aug. 15, 2000

[54] DECORATION SPECTACLES

[76] Inventor: Tong-Wen Chen, 58, Ma Yuan West St., Taichung, Taiwan

[21] Appl. No.: 09/449,446

[22] Filed: Nov. 25, 1999

[51] Int. Cl.[7] ........................................................ G02C 9/00
[52] U.S. Cl. ................................................ 351/47; 351/52
[58] Field of Search ................................. 351/41, 44, 47, 351/57, 59

[56] References Cited

U.S. PATENT DOCUMENTS 5,335,025  8/1994  Wang ......................................... 351/47

Primary Examiner—Huy Mai

[57] ABSTRACT

A pair of decoration spectacles has a front frame, two temples connected to the front frame, and two decoration frames connected to the front frame. The front frame has two spectacles lenses, two insertion rods, and two connection blocks. Each insertion rod has a rectangular through hole. Each connection block has a pivot groove and a notch communicating with the pivot groove. Each temple has a hollow pivot lug engaging with the respective connection block and an insertion post inserted in the respective pivot groove via the respective notch. Each decoration frame has a connection lug and a sunscreen lens. Each connection lug has a pivot hole receiving the respective insertion rod and a slot communicating with the pivot hole.

1 Claim, 7 Drawing Sheets

DECORATION SPECTACLES

BACKGROUND OF THE INVENTION

The present invention relates to a pair of spectacles. More particularly, the present invention relates to a pair of decoration spectacles.

A pair of conventional decoration spectacles has a plurality of fastening elements such as rivets, screws and bolts. Therefore, it is cumbersome to assemble a pair of conventional decoration spectacles.

SUMMARY OF THE INVENTION

An object of the present invention is to provide a pair of decoration spectacles which can be assembled easily.

Another object of the present invention is to provide a pair of decoration spectacles which has two decoration frames to be detached easily.

Accordingly, a pair of decoration spectacles comprise a front frame, two temples connected to the front frame, and two decoration frames connected to the front frame. The front frame has two spectacles lenses, two insertion rods, and two connection blocks. Each of the insertion rods has a rectangular through hole. Each of the connection blocks has a pivot groove and a notch communicating with the pivot groove. Each of the temples has a hollow pivot lug engaging with the respective connection block and an insertion post inserted in the respective pivot groove via the respective notch. Each of the decoration frames has a connection lug and a sunscreen lens. Each of the connection lugs has a pivot hole receiving the respective insertion rod and a slot communicating with the pivot hole.

DETAILED DESCRIPTION OF THE INVENTION

Figure 1:
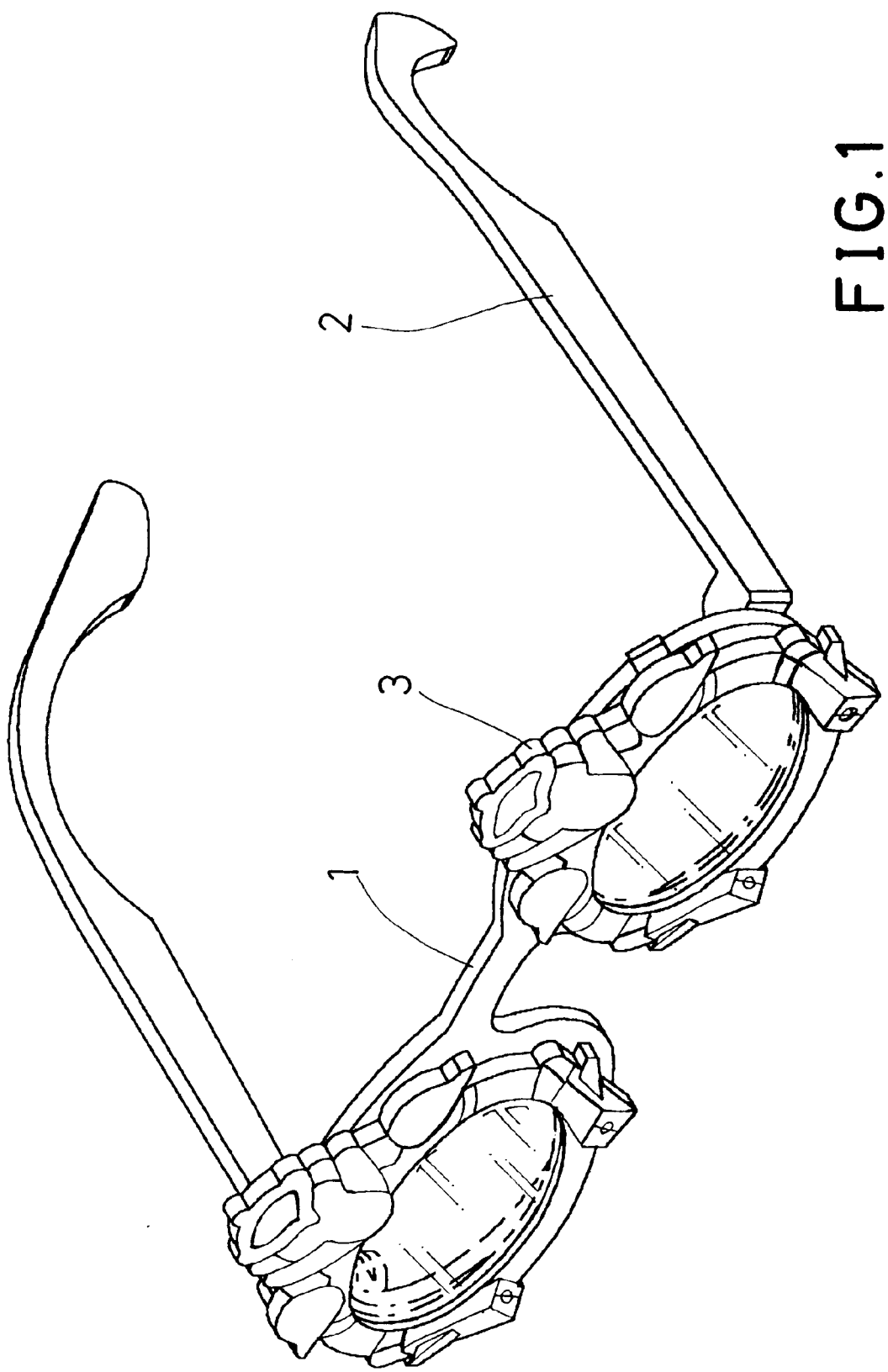
FIG. 1 is a perspective assembly view of a pair of decoration spectacles of a preferred embodiment in accordance with the present invention.
Figure 2:
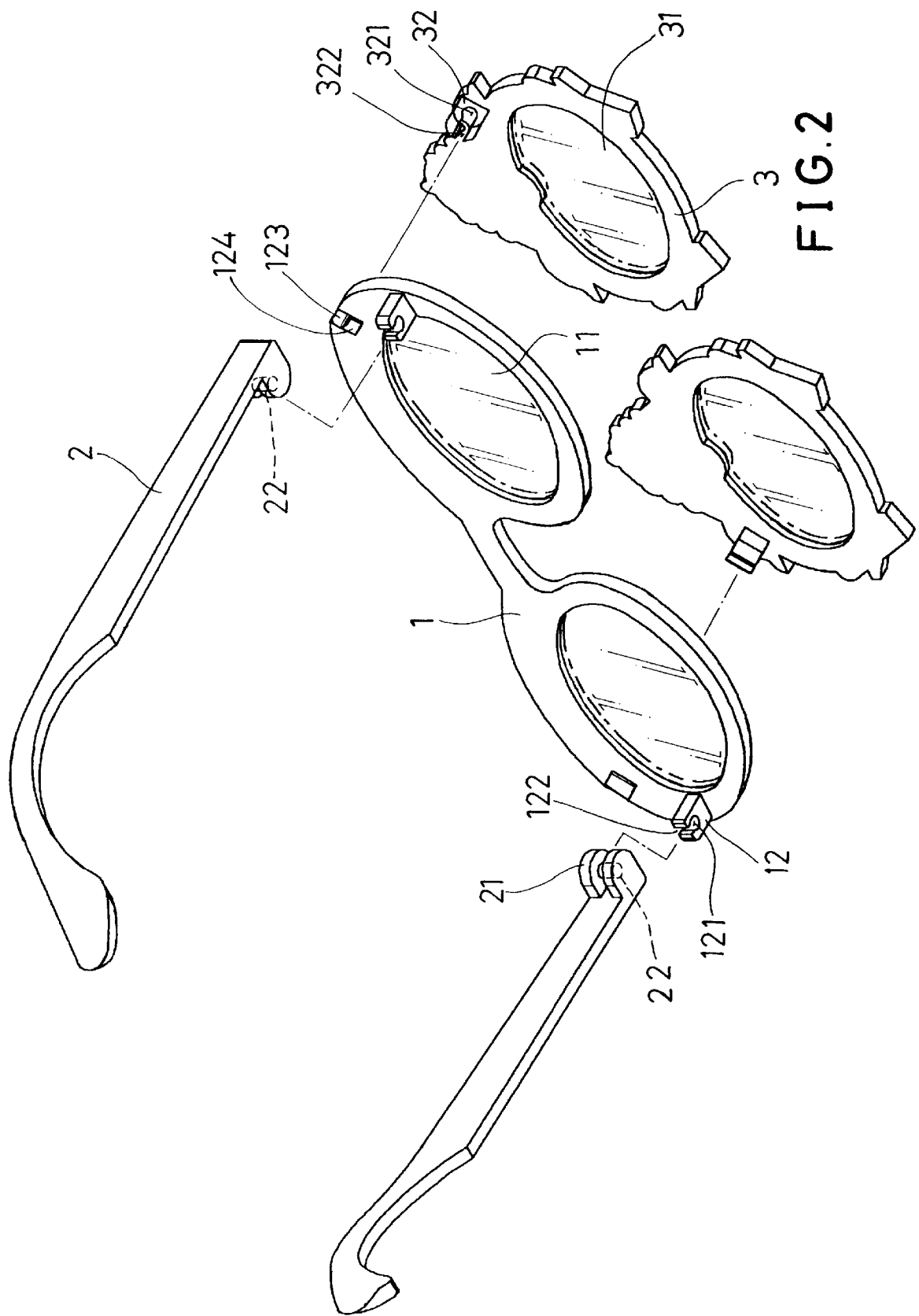
FIG. 2 is a perspective exploded view of a pair of decoration spectacles of a preferred embodiment in accordance with the present invention.
Figure 3:
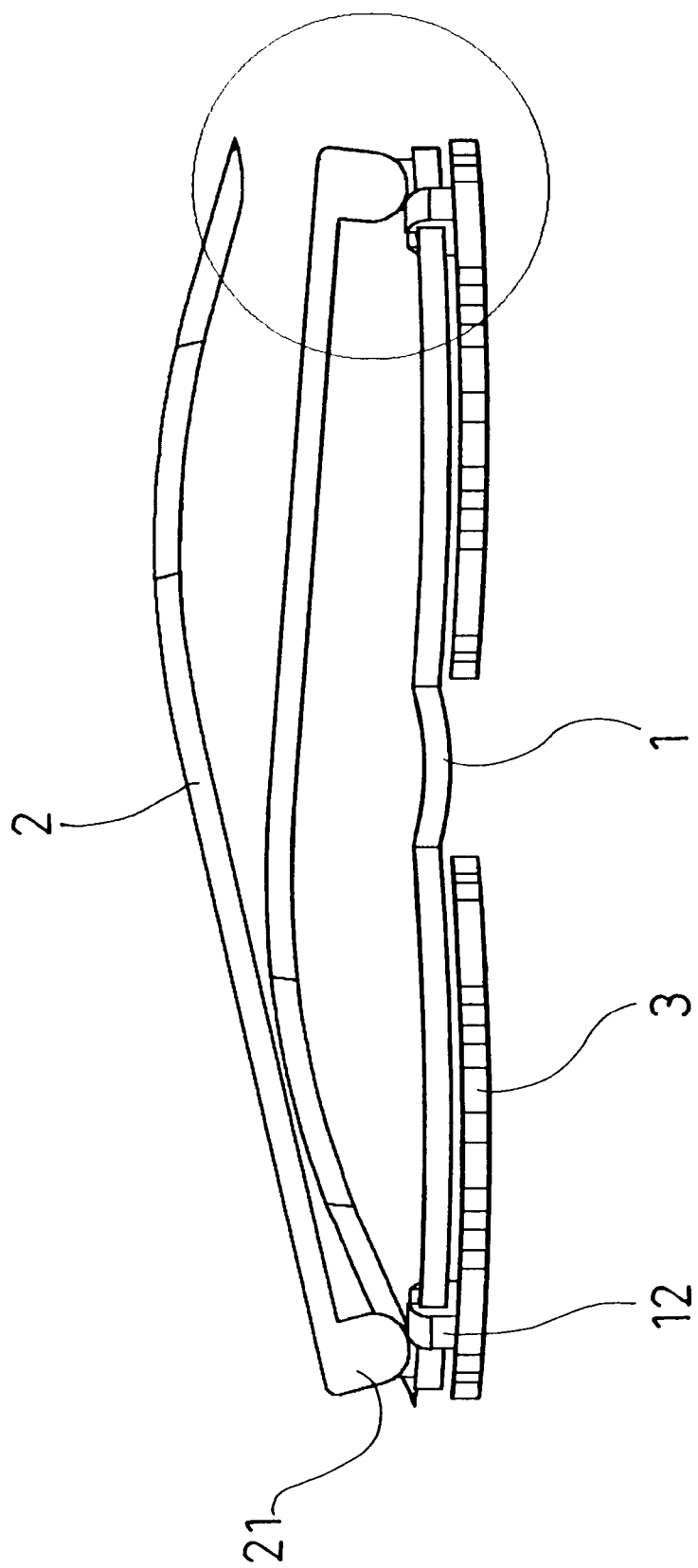
FIG. 3 is a schematic view illustrating a folding of a pair of decoration spectacles of a preferred embodiment in accordance with the present invention.
Figure 4:
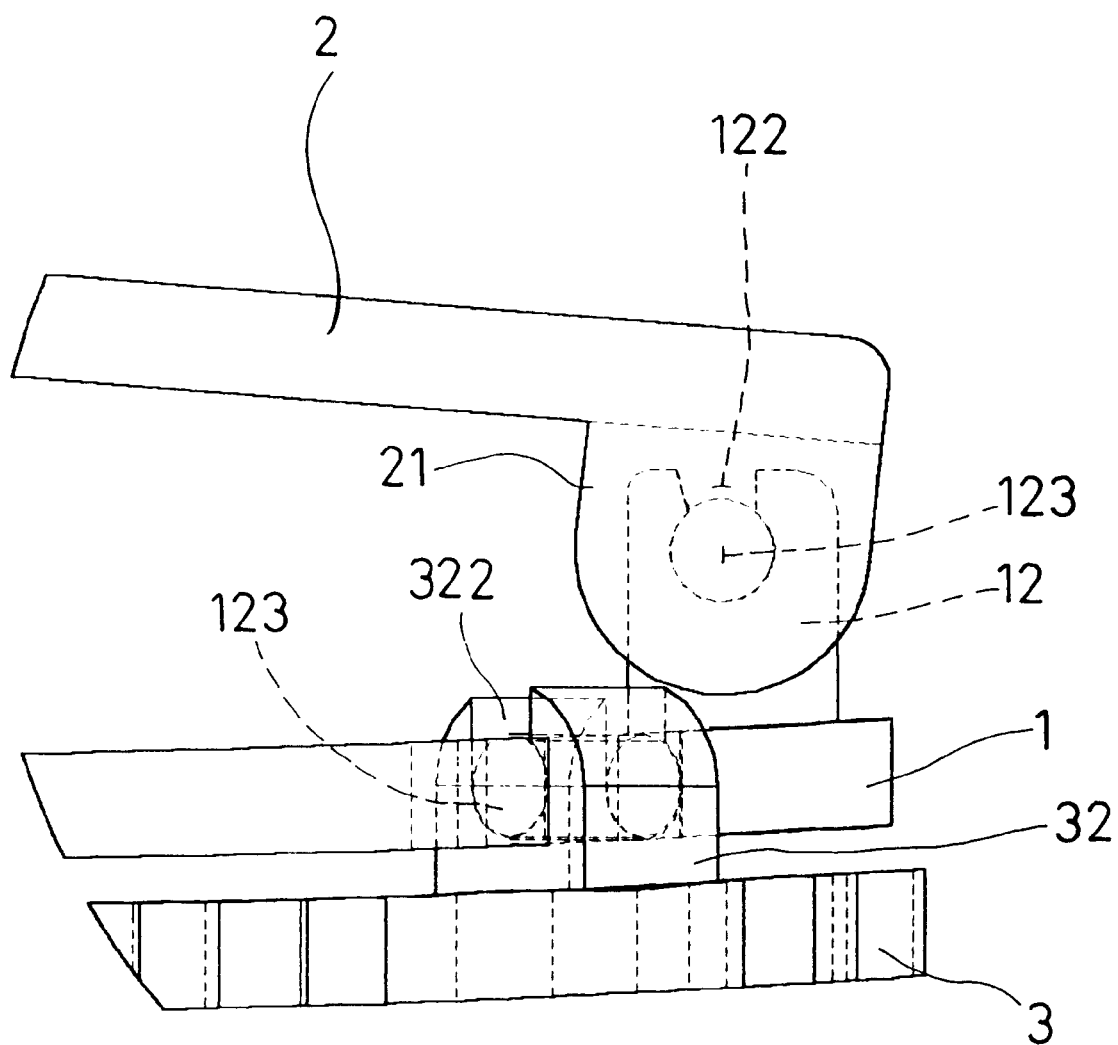
FIG. 4 is a schematic view illustrating a connection of a connection lug and an insertion rod and a connection of a connection block and a pivot lug of a preferred embodiment in accordance with the present invention.
Figure 5:
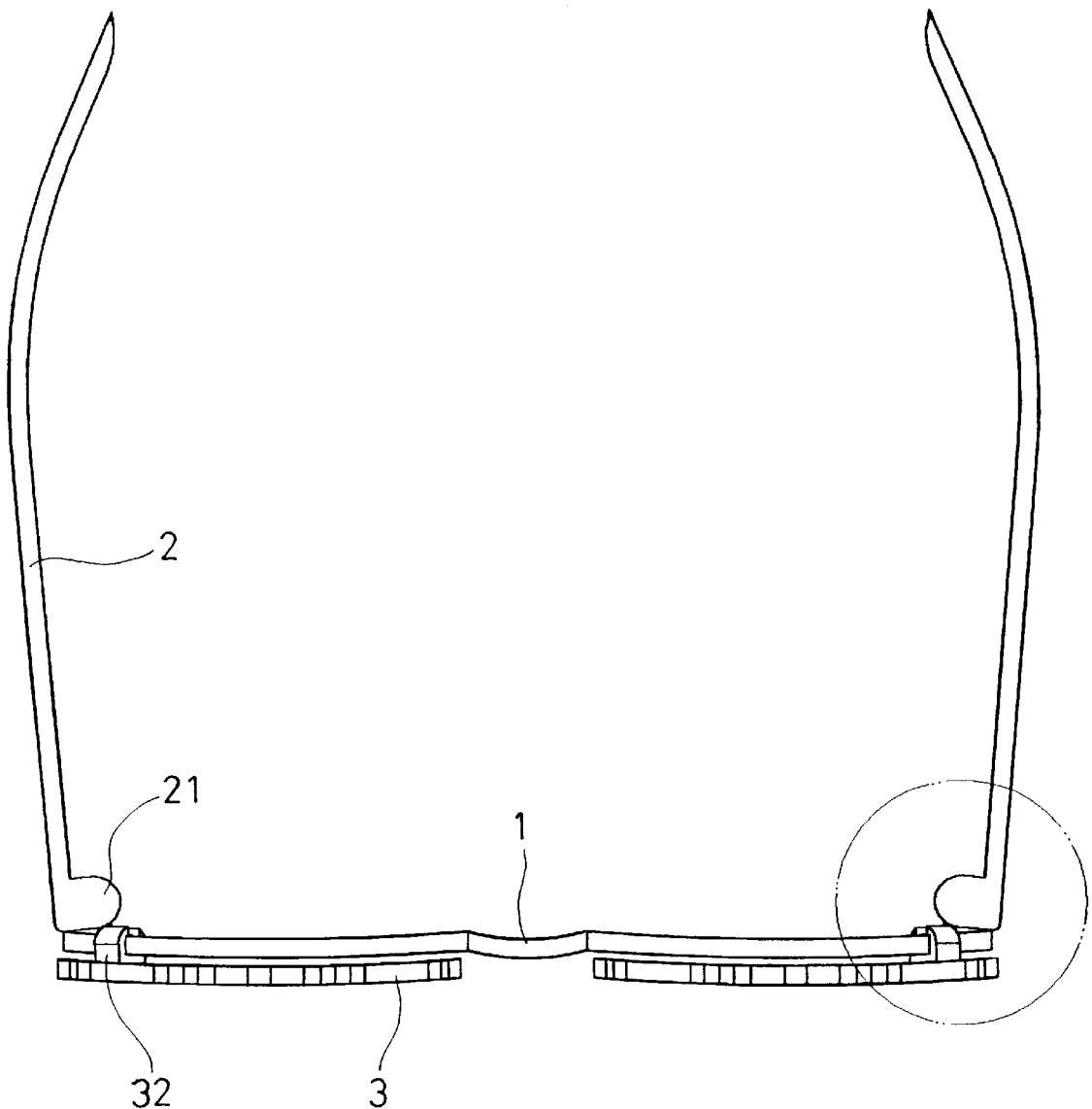
FIG. 5 is a schematic view illustrating an extension of a pair of decoration spectacles of a preferred embodiment in accordance with the present invention.
Figure 5A:
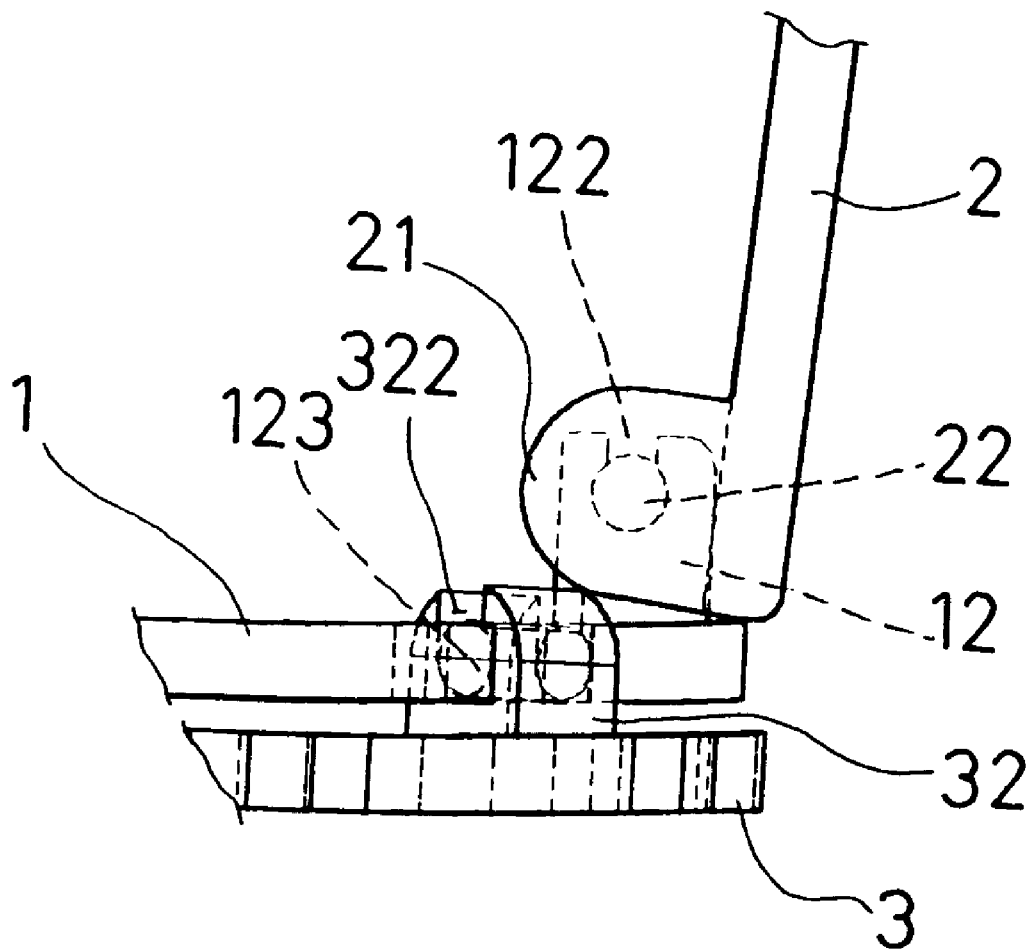
FIG. 5A is another schematic view illustrating a connection of a connection lug and an insertion rod and a connection of a connection block and a pivot lug of a preferred embodiment in accordance with the present invention.
Figure 6:
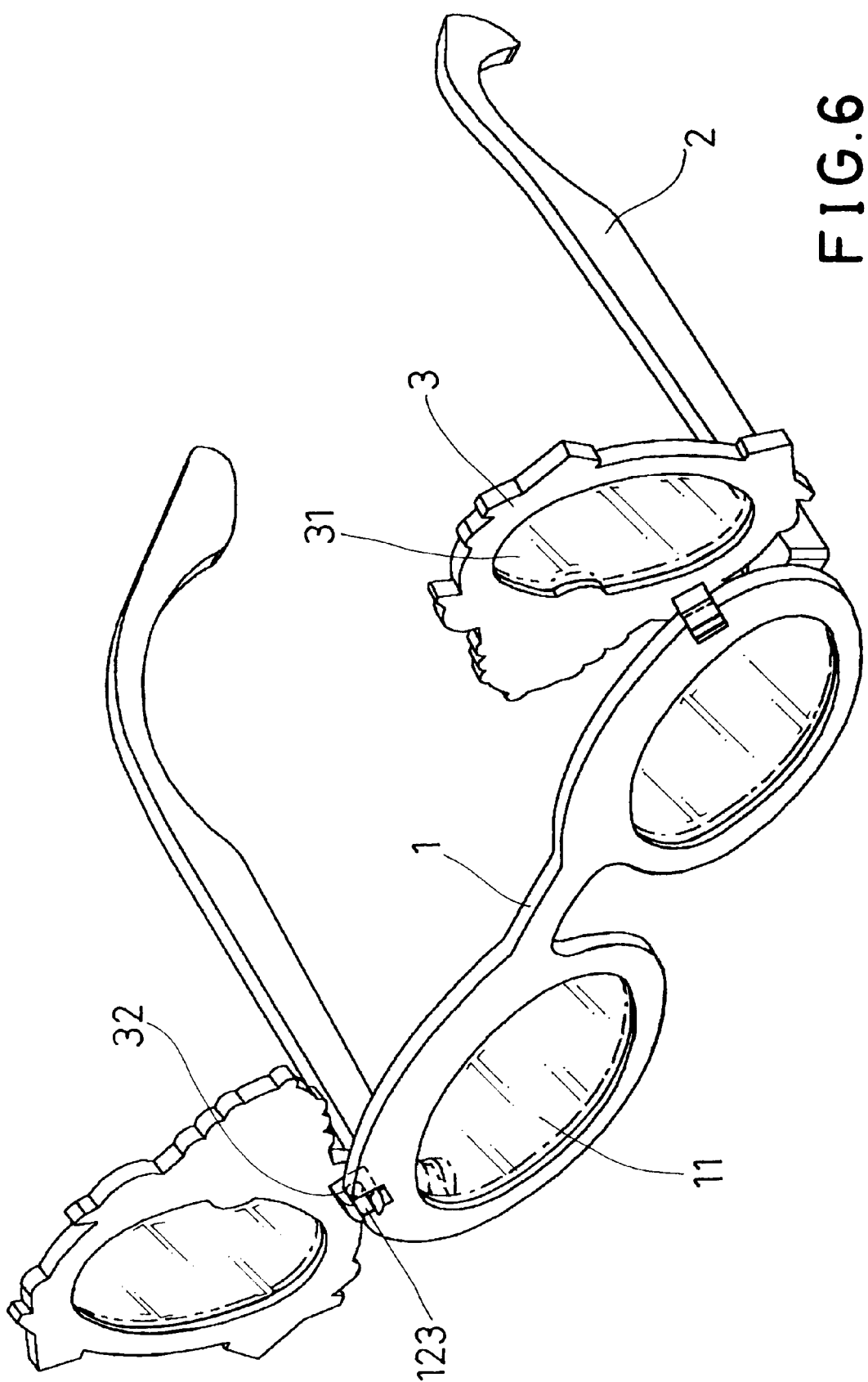
FIG. 6 is a perspective assembly view of a pair of decoration spectacles of a preferred embodiment while two decoration frames are extended.

Referring to FIGS. 1 to 6, a pair of decoration spectacles comprise a front frame 1, two temples 2 connected to the front frame 1, and two decoration frames 3 connected to the front frame 1.

The front frame 1 has two spectacles lenses 11, two insertion rods 123, and two connection blocks 12.

Each of the insertion rods 123 has a rectangular through hole 124.

Each of the connection blocks 12 has a pivot groove 121 and a notch 122 communicating with the pivot groove 121.

Each of the temples 2 has a hollow pivot lug 21 engaging with the respective connection block 12 and an insertion post 22 inserted in the respective pivot groove 121 via the respective notch 122.

Each of the decoration frames 3 has a connection lug 32 and a sunscreen lens 31.

Each of the connection lugs 32 has a pivot hole 321 receiving the respective insertion rod 123 and a slot 322 communicating with the pivot hole 321.

Referring to FIGS. 5 and 6 again, each of the insertion posts 22 can be rotated in the respective pivot groove 121. Each of the insertion rods 123 can be rotated in the respective slot 322.

The present invention has the following advantages. The decoration spectacles of the present invention can be assembled easily. The decoration frames of the present invention can be detached easily.

The present invention is not limited to the above embodiment but various modification thereof may be made. Furthermore, various changes in form and detail may be made without departing from the scope of the present invention.

I claim:

1. A pair of decoration spectacles comprising:

a front frame, two temples connected to the front frame, and two decoration frames connected to the front frame, the front frame having two spectacles lenses, two insertion rods, and two connection blocks, each said insertion rod having a rectangular through hole, each said connection block having a pivot groove and a notch communicating with the pivot groove, each said temple having a hollow pivot lug engaging with the respective connection block and an insertion post inserted in the respective pivot groove via the respective notch, each said decoration frame having a connection lug and a sunscreen lens, and each said connection lug having a pivot hole receiving the respective insertion rod and a slot communicating with the pivot hole.

\* \* \* \* \*